No. 825,367. PATENTED JULY 10, 1906.
H. E. WHITE.
CONTROLLER.
APPLICATION FILED NOV. 11, 1905.
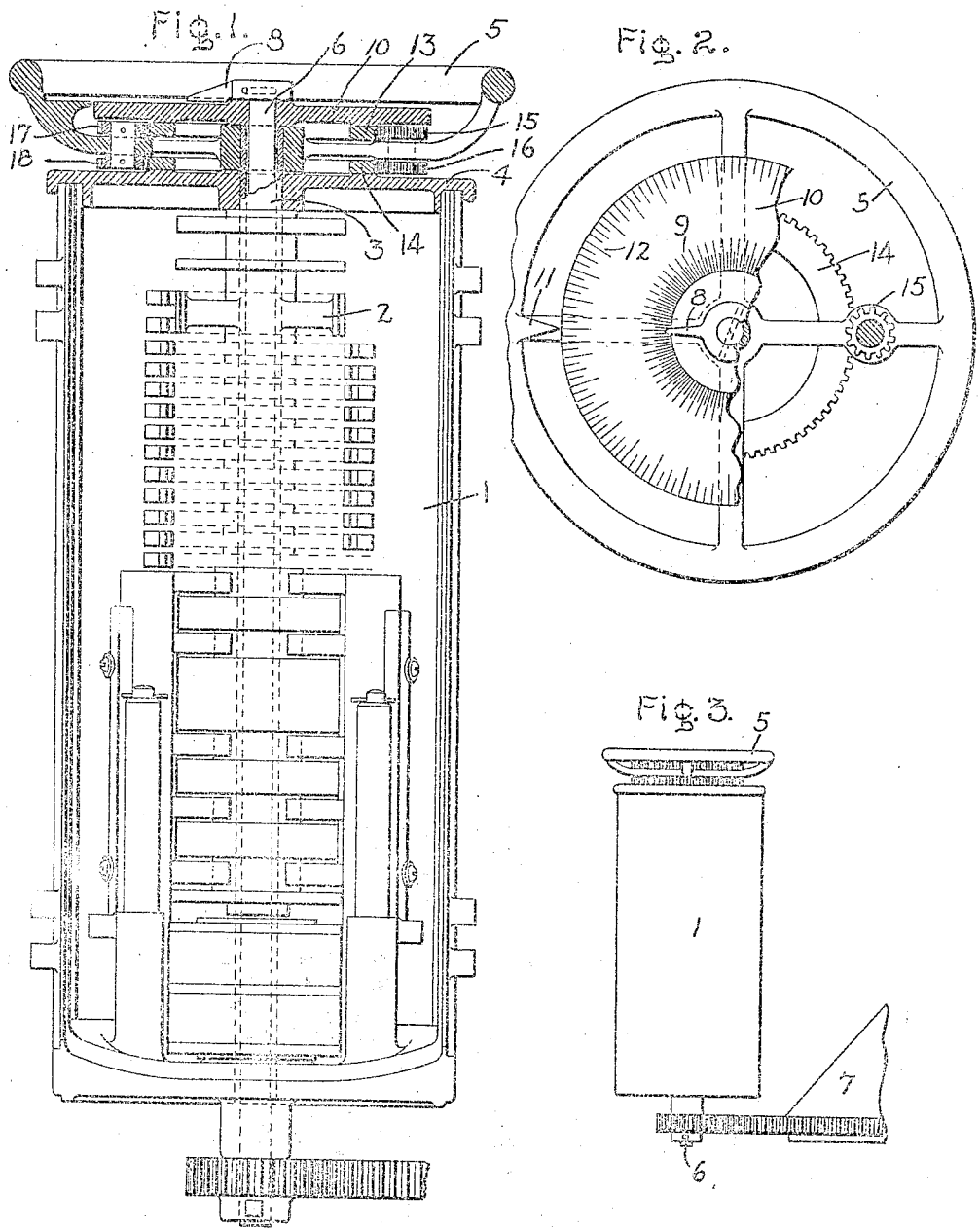

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

CONTROLLER.

No. 825,367.     Specification of Letters Patent.     Patented July 10, 1906.

Application filed November 11, 1905. Serial No. 286,845.

*To all whom it may concern:*

Be it known that I, HAROLD E. WHITE, a citizen of the United States, residing at Schenectady, county of Schenectady, State of New York, have invented certain new and useful Improvements in Controllers, of which the following is a specification.

The present invention relates to controllers, and particularly to controllers embodying indicating mechanism adapted to show the position of the part which is governed by the controller; and the object of the present invention is to improve the construction and organization of parts constituting such a controller.

One instance of the use of a controller of the character specified is that of an operating system for turrets wherein the position of the controller determines the direction and speed of rotation of the turret and there being indicating mechanism geared to or otherwise associated with the turret for the purpose of indicating at all times the position of the turret. It is of course necessary that the indicating apparatus be accurate, and it is also desirable that it should be so arranged as to enable the operator to note at a glance the position of the turret relative to that corresponding to the position of the controller-handle or operating means. Furthermore, the mechanism should be so organized that the controller may be operated in the most convenient manner without interference on the part of indicating mechanism.

The present invention contemplates a construction and arrangement of parts embodying all the foregoing features.

The present invention will be more fully understood from the following description thereof, taken in connection with the accompanying drawings.

In said drawings, Figure 1 is a front elevation of a controller with a portion of the protecting-casing removed and the portions arranged in accordance with the present invention, shown in cross-section. Fig. 2 is a plan view of the parts shown in Fig. 1, a portion of the dial being broken away; and Fig. 3 is a front elevation of the controller shown in Fig. 1, together with a portion of the object to be moved and the gearing between said object and the indicating-shaft of the controller.

Reference being had to the drawings, 1 indicates a controller of any usual or preferred type having a movable contact-carrying member 2, supported upon and rotatable with a hollow shaft 3, which extends upwardly through the top cover 4 of the casing and carries at its upper end a hand-wheel or other operating member 5. 6 is a shaft arranged within the hollow shaft 3 and illustrated as geared at its lower end to a turret 7, whose movement is determined by the controller. The connection between the turret and the shaft 6 need not be mechanical, and, in fact, any driving arrangement may be employed, provided that it causes the shaft to indicate the position of the turret. At the upper end the indicating-shaft is provided with a pointer 8, which is adapted to sweep over a series of graduations 9 on a disk 10, and thus indicate the angular position of the turret at all times. A pointer 11 on the hand-wheel 5 is adapted to coöperate with the same series of graduations or with a separate series 12, the pointer 11 showing the direction and speed of rotation of the turret, while the pointer 8 shows the position of the turret at any particular instant and informs the operator when the turret has reached the desired position.

It is desirable to have the graduations located closely to the plane or planes of movement of the pointers, and for this purpose the disk is arranged concentric with the controller-shaft and supported with its graduated surface or surfaces substantially in the plane or planes of movement as the pointers. Since the shaft 6 is inclosed within the controller-shaft, the disk 12 must be arranged above the controller-handle or operating member, and it cannot be readily supported upon the controller without using a bracket, which extends from the controller-casing and prevents a continuous rotary movement of the controller-shaft or places an obstruction in the way of the operator in turning the hand-wheel from certain points. The present invention contemplates means which holds the indicating-disk stationary without being open to either of the foregoing objections. To this end I provide the disk, which may be loosely supported upon the upper end of either shaft, with a gear 13, fixed to its under side and arranged concentric with the shafts 3 and 6, and in axial alinement therewith secure a similar gear 14 to the top of the controller-casing and on the operating hand-wheel arrange a pair of axially-alined and rigidly-connected pinions 15 and 16, similar in form and size and meshing, respectively, with the gears 13 and 14. Only one pair of such pinions is required; but I have also shown a second pair 17 and 18, located diametrically opposite the other pair, forming thereby a balanced arrangement of parts.

It is evident that as the controller-handle is moved in one direction or the other the pinion 16 or the pinions 16 and 18, as the case may be, will travel about the gear 14 and by being connected to pinion 15 or 15 and 16, as the case may be, the latter pinion or pinions will be given similar movements. Since the gear 14 is stationary, the effect of the rotating pinions is to hold the gear 13 stationary also regardless of the movement of the controller-handle. The disk is therefore securely supported in close proximity to the pointers without the use of objectionable brackets or other similar devices.

What I claim as new, and desire to secure by Letters Patent of the United States, is—

1. In combination, a revoluble shaft, a loosely-supported member, a pair of similar gears secured respectively to said member and to a fixed support and arranged concentric with said shaft, and a pair of connected axially-alined similar pinions movable with said shaft and meshing with said gears for holding said member against rotation.

2. In a controller, a revoluble shaft, a disk loosely supported on an axis concentric with the shaft, and means for holding said disk against rotation including gearing portions of which are secured to said disk and a fixed part of the controller and other portions of which are carried by and movable with said controller-shaft.

3. In a controller, a revoluble hollow shaft, a second shaft revolubly mounted within said hollow shaft, a graduated member loosely supported concentric with said shaft, an operating-handle connected to said hollow shaft, index-fingers secured to said shafts and adapted to register with the graduation on said disk, and means for holding said disk against rotation including intermeshing gearing a portion of which is fixed to the controller-casing another portion of which is fixed to said disk, and another portion of which is carried by and movable with said hollow shaft.

4. In a controller, a revoluble controller-shaft, a disk loosely supported on an axis concentric with the shaft, a pair of similar gears secured respectively to said disk and to a fixed portion of said controller and arranged concentric with said shaft, and a pair of connected axially-alined similar pinions movable with said shaft and meshing with said gear for holding said disk against rotation.

5. In a controller, a hollow revoluble shaft, a second shaft revolubly mounted within said hollow shaft, a graduated disk loosely supported on an axis concentric with said shaft, a pair of similar gears geared respectively to said disk and to a fixed portion of the controller and arranged concentric with said shaft, an operating member in said hollow shaft, index-fingers on each of said shafts cooperating with the graduations on said disk, and a pair of connected axially-alined similar pinions movable with said hollow shaft and meshing with said gears for holding said disk against rotation.

In witness whereof I have hereunto set my hand this 10th day of November, 1905.

HAROLD E. WHITE.

Witnesses:
BENJAMIN B. HULL,
MARGARET E. WOOLLEY.